United States Patent
Baek et al.

(10) Patent No.: US 11,657,935 B2
(45) Date of Patent: May 23, 2023

(54) IRON OXIDE MAGNETIC POWDER AND MANUFACTURING METHOD THEREFOR

(71) Applicant: KOREA INSTITUTE OF MACHINERY & MATERIALS, Daejeon (KR)

(72) Inventors: Youn Kyoung Baek, Changwon-Si (KR); Jung Goo Lee, Busan (KR); Kyung Min Kim, Busan (KR); Young Kuk Kim, Changwon-Si (KR); Min Ji Pyo, Changwon-Si (KR)

(73) Assignee: KOREA INSTITUTE OF MATERIALS SCIENCE, Changwon-si (KR)

( * ) Notice: Subject to any disclaimer, the term of this patent is extended or adjusted under 35 U.S.C. 154(b) by 176 days.

(21) Appl. No.: 17/051,979

(22) PCT Filed: Jul. 17, 2019

(86) PCT No.: PCT/KR2019/008835
§ 371 (c)(1),
(2) Date: Oct. 30, 2020

(87) PCT Pub. No.: WO2020/017887
PCT Pub. Date: Jan. 23, 2020

(65) Prior Publication Data
US 2021/0241950 A1   Aug. 5, 2021

(30) Foreign Application Priority Data

Jul. 17, 2018 (KR) .................. 10-2018-0082783
Jul. 12, 2019 (KR) .................. 10-2019-0084143

(51) Int. Cl.
*H01F 1/11* (2006.01)
*B22F 9/08* (2006.01)
(Continued)

(52) U.S. Cl.
CPC .................. *H01F 1/11* (2013.01); *B22F 1/07* (2022.01); *B22F 9/08* (2013.01); *C01G 49/06* (2013.01);
(Continued)

(58) Field of Classification Search
CPC  C01P 2202/72; C01P 2006/42; H01F 1/0054; H01F 1/0315
See application file for complete search history.

(56) References Cited

FOREIGN PATENT DOCUMENTS

| JP | 2008063199 A | * | 3/2008 |
| JP | 2008-117855 A | | 5/2008 |

(Continued)

OTHER PUBLICATIONS

Machine translation JP2008063199 (Year: 2008).*
(Continued)

*Primary Examiner* — Alexandre F Ferre
(74) *Attorney, Agent, or Firm* — Hauptman Ham, LLP (57) ABSTRACT

The present invention relates to a method for producing a magnetic powder, including: preparing a precursor solution containing an iron precursor and a silica precursor; spraying the precursor solution to form iron/silica precursor droplets; drying the iron/silica precursor droplets to produce iron/silica precursor particles; and heat treating the iron/silica precursor particles to produce an iron oxide/silica composite powder in which iron oxide particles are embedded in a silica matrix. The present invention also relates to a magnetic powder produced by the method. The present invention may provide an iron oxide magnetic powder that does not use rare earth elements and a method for producing the same.

13 Claims, 6 Drawing Sheets

(51) Int. Cl.
  *B22F 1/00*  (2022.01)
  *C01G 49/06*  (2006.01)
  *B22F 1/07*  (2022.01)
(52) U.S. Cl.
  CPC ..... *B22F 2302/256* (2013.01); *C01P 2004/01* (2013.01); *C01P 2004/64* (2013.01); *C01P 2006/42* (2013.01)

(56) References Cited

FOREIGN PATENT DOCUMENTS

| | | |
|---|---|---|
| JP | 2008-174405 A | 7/2008 |
| JP | 2015-032760 A | 2/2015 |
| JP | 2016-130208 A | 7/2016 |
| JP | 2018-110168 A | 7/2018 |
| KR | 10-2014-0100347 A | 8/2014 |
| KR | 10-2045771 B1 | 11/2019 |
| WO | WO-2016111224 A1 * | 7/2016 ............. B82Y 25/00 |

OTHER PUBLICATIONS

Machine translation WO201611124A1 (Year: 2016).*
Korean Office Action dated Sep. 7, 2020, in connection with the corresponding Korean Patent Application No. 10-2019-0084143.
International Search Report dated Oct. 25, 2019, corresponding to International Application No. PCT/KR2019/008835.
Written Opinion dated Oct. 25, 2019, corresponding to International Application No. PCT/KR2019/008835.

* cited by examiner

IRON OXIDE MAGNETIC POWDER AND MANUFACTURING METHOD THEREFOR

CROSS-REFERENCE TO RELATED APPLICATION

This present application is a national stage filing under 35 U.S.C § 371 of PCT application number PCT/KR2019/008835 filed on Jul. 17, 2019 which is based upon and claims the benefit of priority to Korean Patent Application No. 10-2018-0082783 filed Jul. 17, 2018 and Korean Patent Application No. 10-2019-0084143 filed Jul. 12, 2019 in the Korean Intellectual Property Office. The disclosures of the above-listed applications are hereby incorporated by reference herein in their entireties.

TECHNICAL FIELD

The present invention relates to an iron oxide magnetic powder and a manufacturing method for producing the same, and more particularly, to an iron oxide magnetic powder that does not use a rare earth element and a method for producing the same.

BACKGROUND ART

Generally, a permanent magnet is a material that retains a magnetic field within a material even when an externally applied magnetic field is removed, and is essential for motors, generators, or electronics.

In particular, the permanent magnet that have high added value and are applied to video recorders, computer disk drives, and electric motors applied in various industries have a decisive effect on the quality and performance of the final product.

Alnico-based and Ferrite-based alloys for producing the permanent magnet have been used. However, recently, as miniaturization and high-performance of electronic, communication, and mechanical parts have been promoted, neodymium-iron-boron (Nd—Fe—B)-based materials having excellent magnetic properties have been widely used in magnets.

The neodymium-iron-boron (Nd—Fe—B)-based magnet was developed and commercialized by Sumitomo Special Metal in Japan in 1982 and is a strong permanent magnet with the largest maximum magnetic energy.

However, the neodymium-iron-boron (Nd—Fe—B)-based magnet contains a rare earth element such as neodymium.

These rare earth elements are relatively low in supply, which may lead to price increases and/or shortages in the future. In addition, many permanent magnets containing the rare earth elements are expensive to manufacture.

For example, processes for producing NdFeB and ferrite magnets generally include material grinding, material compression, and sintering at temperatures above 1000° C. All of these processes contribute to increasing the producing cost of permanent magnets. In addition, the environment must be significantly damaged to mine the rare earth elements.

Therefore, there is a need for a magnetic material that may replace the permanent magnets containing such rare earth elements. In recent years, a new high performance of a magnetic powder has been required.

A nano-composite magnetic powder is attracting attention as a means of such high performance, in which the nano-composite magnetic powder is such that a soft magnetic phase with high magnetization and a hard magnetic phase with high coercivity are uniformly distributed in the same tissue, and both are magnetically coupled by an exchange interaction.

For example, Japanese Patent Laid-Open No. 2008-117855 (hereinafter referred to as "Patent Document 1") discloses a nano-composite magnet having a core shell structure in which a hard magnetic phase of an $Nd_2Fe_{14}B$ compound is a core and a soft magnetic phase of Fe is a shell.

However, the technique disclosed in Patent Document 1 uses Nd, which is the rare earth element, in the hard magnetic phase.

In other words, as described above, the rare earth element is expensive and there is a possibility that the supply becomes unstable. Therefore, it is necessary to suppress the use of the rare earth elements as much as possible.

DISCLOSURE OF INVENTION

Technical Problem

Aspects of the present invention provide an iron oxide magnetic powder that does not use rare earth elements and a method for producing the same.

Technical Solution

The present invention provides a magnetic powder, including a silica matrix; and particles of an iron oxide embedded in the silica matrix, in which the particles of the iron oxide include particles of a hard magnetic iron oxide, and the particles of the hard magnetic iron oxide are $\varepsilon\text{-}Fe_2O_3$.

Also, the present invention provides a magnetic powder, in which a proportion of the particles of the hard magnetic iron oxide in the iron oxide corresponds to 70 to 100%, a proportion of the remaining iron oxide other than the hard magnetic iron oxide in the iron oxide corresponds to 0 or greater than 0 and less than 30%, and the remaining iron oxide is $\alpha\text{-}Fe_2O_3$.

And, the present invention provides a magnetic powder, in which a diameter of the particles of the iron oxide is 20 to 45 nm.

And, the present invention provides a magnetic powder, in which a value of a full width at half-maximum (FWHM) of the $\varepsilon\text{-}Fe_2O_3$ is 0.36° to 0.53°.

And, the present invention provides a magnetic powder, in which the value of the FWHM of the $\varepsilon\text{-}Fe_2O_3$ is 0.40° to 0.53°.

And, the present invention provides a magnetic powder, in which the value of the FWHM of the $\varepsilon\text{-}Fe_2O_3$ is an FWHM of a diffraction peak with respect to a {122} plane, which is a main peak of a crystal phase of the $\varepsilon\text{-}Fe_2O_3$.

And, the present invention provides a magnetic powder, in which the particles of the iron oxide include particles of a hard magnetic iron oxide, and the particles of the hard magnetic iron oxide are $\varepsilon\text{-}Fe_2O_3$.

And, the present invention provides a magnetic powder, in which a proportion of the particles of the hard magnetic iron oxide in the particles of the iron oxide corresponds to 70 to 100%, a proportion of the remaining iron oxide other than the hard magnetic iron oxide in the iron oxide corresponds to 0 or greater than 0 and less than 30%, and the remaining iron oxide is $\alpha\text{-}Fe_2O_3$.

And, the present invention provides a magnetic powder, in which a diameter of the particles of the iron oxide is 20 to 45 nm.

And, the present invention provides a magnetic powder, in which a value of a full width at half-maximum (FWHM) of the $\varepsilon\text{-Fe}_2\text{O}_3$ is 0.36° to 0.53°.

And, the present invention provides a magnetic powder, in which the value of the FWHM of the $\varepsilon\text{-Fe}_2\text{O}_3$ is 0.40° to 0.53°.

And, the present invention provides a magnetic powder, in which the value of the FWHM of the $\varepsilon\text{-Fe}_2\text{O}_3$ is an FWHM of a diffraction peak with respect to a {122} plane, which is a main peak of a crystal phase of the $\varepsilon\text{-Fe}_2\text{O}_3$.

And, the present invention provides a method for producing a magnetic powder, including: preparing a precursor solution containing an iron precursor and a silica precursor; spraying the precursor solution to form iron/silica precursor droplets; drying the iron/silica precursor droplets to produce iron/silica precursor particles; and heat treating the iron/silica precursor particles to produce an iron oxide/silica composite powder in which iron oxide particles are embedded in a silica matrix.

And, the present invention provides a method for producing a magnetic powder, further including producing an iron oxide powder by removing the silica matrix of the iron oxide/silica composite powder through a washing process.

And, the present invention provides a method for producing a magnetic powder, in which a temperature of the heat treating is 1080 to 1210° C.

And, the present invention provides a method for producing a magnetic powder, in which a temperature of the heat treating is 1080 to 1150° C.

And, the present invention provides a method for producing a magnetic powder, in which a concentration of the iron precursor in the precursor solution is 15 to 60 mol % compared to 1 mol % of the silica precursor.

Advantageous Effects of Invention

Therefore, the present invention may provide an iron oxide magnetic powder that does not use rare earth elements and a method for producing the same.

In addition, in the present invention, after forming a droplet by spraying a precursor solution, a drying process and a heat treatment process may be performed to produce a hard magnetic iron oxide of $\varepsilon\text{-Fe}_2\text{O}_3$. Therefore, an $\varepsilon\text{-Fe}_2\text{O}_3$ powder may be produced by a short time and a simple process.

BEST MODE OF THE INVENTION

The benefits and features of the present invention and the manner of achieving them will become apparent with reference to the embodiments described in detail below with reference to the accompanying drawings. The present invention is not limited to the embodiments set forth herein, but it will be embodied in many different forms. The embodiments are merely illustrative of the present disclosure, and are provided so that a person skilled in the art may fully understand the scope of the invention. The present invention is only defined by the scope of the claims.

Hereinafter, specific contents for carrying out the present invention will be described in detail with reference to the accompanying drawings. The same reference numerals refer to the same components regardless of the drawings, and "and/or" includes each and every combination of one or more of the mentioned items.

Although the first, second, etc. are used to describe various components, it goes without saying that these components are not limited by these terms. These terms are only used to distinguish one component from another component. Therefore, naturally, the first component mentioned below may be the second component within the technical spirit of the present invention.

The terminology used herein is for the purpose of illustrating embodiments and is not intended to be limiting of the present invention. In the present specification, singular forms include plural forms unless otherwise specified herein. As used herein, "comprises" and/or "comprising" does not exclude the presence or addition of one or more other components other than the components mentioned.

Unless otherwise defined, all terms (including technical and scientific terms) used herein may be used in a sense that may be commonly understood by those of ordinary skill in the art. In addition, the terms defined in the commonly used dictionaries are not ideally or excessively interpreted unless they are specifically defined clearly.

The spatially relative terms "below," "beneath," "lower," "above," "upper," or the like may be used to easily describe the correlation between one component and the other component as shown in the drawings. The spatially relative terms should be understood as terms including different directions of components in use or operation in addition to the directions shown in the drawings. For example, if components shown in the drawings are turned over, components described as "below" or "beneath" of other components may be placed "above" other components. Accordingly, an exemplary term "below" may include both the directions below and above. Components may also be oriented in different directions, so that the spatially relative terms may be interpreted depending on the orientation.

Hereinafter, preferred embodiments of the present invention will be described in detail with reference to the accompanying drawings.

Figure 1:
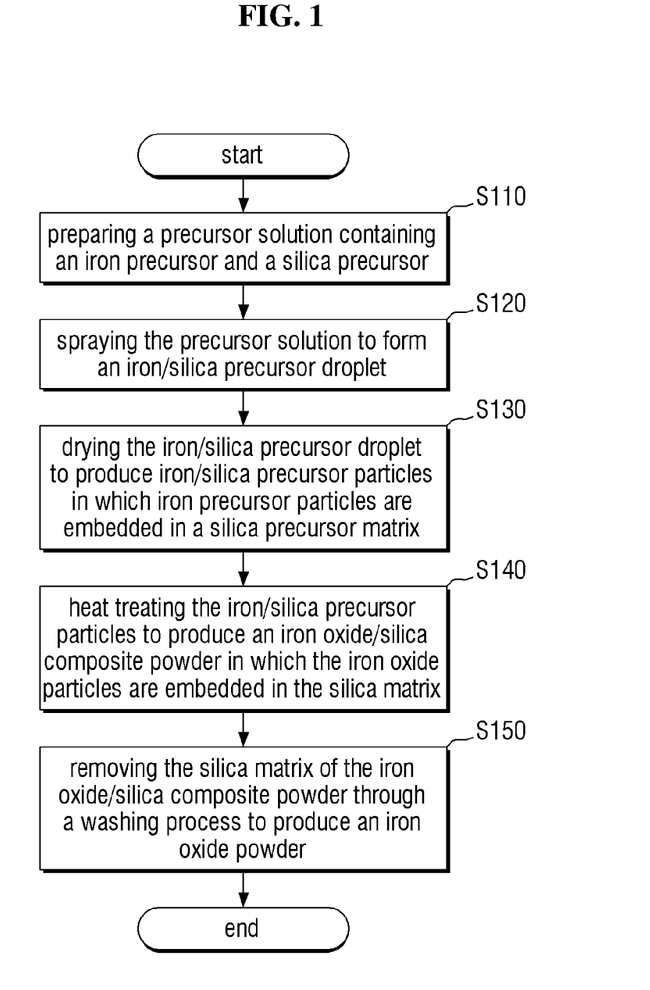
FIG. 1 is a flow chart for explaining a method for producing an iron oxide magnetic powder according to the present invention.
Figure 2:
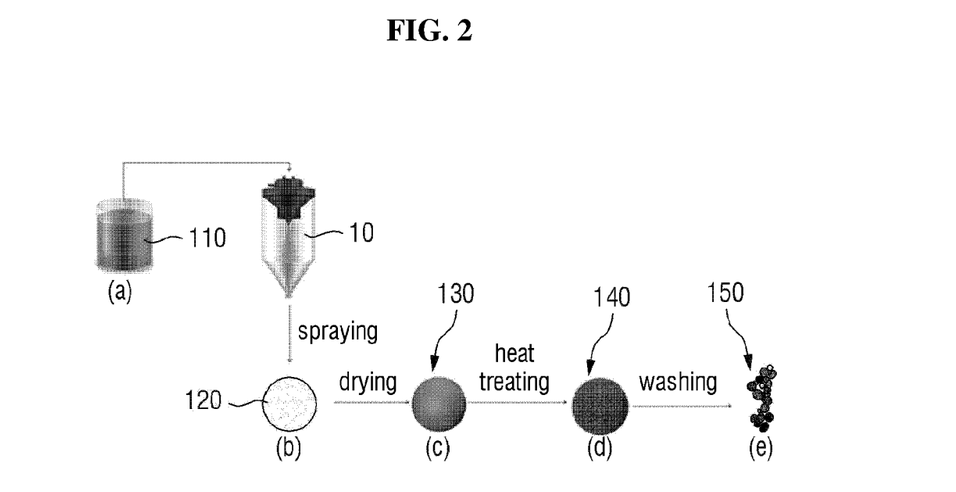
FIG. 2 is a schematic diagram for explaining a method for producing an iron oxide magnetic powder according to the present invention.

FIG. 1 is a flow chart for explaining a method for producing an iron oxide magnetic powder according to the present invention, and FIG. 2 is a schematic diagram for explaining a method for producing an iron oxide magnetic powder according to the present invention.

First, referring to FIGS. 1 and 2, the method for producing the iron oxide magnetic powder according to the present invention includes preparing a precursor solution 110 including an iron precursor and a silica precursor (S110).

More specifically, the iron precursor is a divalent or trivalent iron salt, and is not limited as long as it is a material that may be dissolved in water and ionized. Specifically, the iron precursor may be an inorganic salt containing a divalent or trivalent iron ion, and more specifically, may be a halogen salt containing a divalent or trivalent iron ion.

More specifically, the inorganic salt containing the divalent or trivalent iron ion may be one or two or more selected from $FeCl_2$, $FeCl_3$, $FeBr_2$, $FeBr_3$, $FeI_2$, $FeI_3$, $Fe(NO_3)_2$, $Fe(NO_3)_3$, and their hydrates. The halogen salt containing the divalent or trivalent iron ion may be one or two or more selected from $FeCl_2$, $FeCl_3$, $FeBr_2$, $FeBr_3$, $FeI_2$, and $FeI_3$.

Here, in the present invention, preferably, a concentration of the iron precursor is 15 to 60 mol % compared to 1 mol % of the silica precursor. More preferably, the concentration of the iron precursor is 40 to 60 mol % compared to 1 mol % of the silica precursor. This will be described later.

In addition, the silica precursor may be at least one selected from tetraethylorthosilicate (TEOS), sodium silicate, and tetramethylorthosilicate (TMOS). However, in the present invention, the type of the silica precursor is not limited thereto.

A solvent used in the precursor solution 110 including the iron precursor and the silica precursor is not particularly limited as long as it is a solvent in which the precursor may be dissolved. For example, the solvent may be distilled water, or may be alcohol-based, such as methanol, ethanol, or isopropyl alcohol.

In addition, the solvent may be at least one selected from a group consisting of toluene, cyclohexane, acetone, methylethylketone, methyl isobutyl ketone, ethyl acetate, n-butylacetate, cerulsolveacetate, methylene chloride, methylethylketone, dichloromethane, xylene, and styrene.

Next, referring to FIGS. 1 and 2, the method for producing the iron oxide magnetic powder according to the present invention includes spraying the precursor solution 110 to form an iron/silica precursor droplet 120 (S120).

More specifically, the iron/silica precursor droplet 120 may be formed by spraying the precursor solution through a spray device 10, in which the spraying process may be performed through a known spraying method. Since the spraying process is obvious in the art, a detailed description will be omitted below.

Next, referring to FIGS. 1 and 2, the method for producing the iron oxide magnetic powder according to the present invention includes drying the iron/silica precursor droplet 120 to produce iron/silica precursor particles 130 in which iron precursor particles are embedded in a silica precursor matrix (S130).

More specifically, drying the iron/silica precursor droplet 120 may be performed at a temperature of 110 to 130° C.

For example, a temperature range in an inlet of the spray device 10 in forming the iron/silica precursor droplet 120 by spraying the precursor solution 110 in step S120 described above is 180 to 220° C.

In addition, a temperature range in an outlet of the spray device 10 maintains a temperature of 110 to 130° C. Therefore, the iron/silica precursor droplet 120 is discharged from the spray device 10 and the iron/silica precursor droplet 120 is instantaneously dried, so that the iron/silica precursor particles 130 may be formed.

Here, nano-sized iron precursor particles are formed by the spatial limiting effect due to the instantaneous vaporization of the solvent in the iron/silica precursor droplet 120. As a result, the iron/silica precursor particles 130 in which nano-sized iron precursor particles are embedded in the silica precursor matrix may be produced, in which a size of the iron/silica precursor particles 130 may be 0.1~10 μm.

Figure 3:
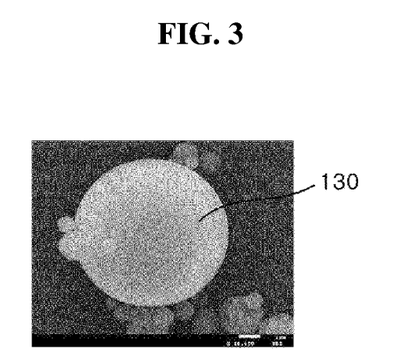
FIG. 3 is a real picture showing an iron/silica precursor particle according to the present invention.

FIG. 3 is a real picture showing an iron/silica precursor particle according to the present invention.

Referring to FIG. 3, the iron/silica precursor particles 130 according to the present invention are formed in the form of a salt powder in which the iron precursor particles are embedded in the silica precursor matrix.

Next, referring to FIGS. 1 and 2, the method for producing the iron oxide magnetic powder according to the present invention includes heat treating the iron/silica precursor particles 130 to produce an iron oxide/silica composite powder 140 in which the iron oxide particles are embedded in the silica matrix (S140).

Here, in the present invention, the iron oxide in the iron oxide/silica composite powder 140 includes a hard magnetic iron oxide. More specifically, the hard magnetic iron oxide corresponds to $\varepsilon$-$Fe_2O_3$.

In general, $\alpha$-$Fe_2O_3$ is classified as nonmagnetic iron oxide, and $\gamma$-$Fe_2O_3$ is classified as a hard magnetic iron oxide.

In addition, in general, an ε crystal phase is known to exhibit ultra-high coercive force (Hc~20 kOe). Therefore, in the present invention, since the iron oxide in the iron oxide/silica composite powder 140 includes the hard magnetic iron oxide of $\varepsilon$-$Fe_2O_3$, a hard magnetic iron oxide powder having ultra-high coercive force characteristics may be manufactured.

As a method for producing $\varepsilon$-$Fe_2O_3$, which is a hard magnetic iron oxide powder, it is known to manufacture a powder of $\varepsilon$-$Fe_2O_3$ by trapping an iron precursor in micelles (reverse micelle method) and making a silica matrix through a sol-gel method.

In other words, the known $\varepsilon$-$Fe_2O_3$ powder is produced by using the reverse micelle method and the sol-gel method.

However, the method for producing $\varepsilon$-$Fe_2O_3$ powder using the reverse micelle method and the sol-gel method is a multi-step process that must be performed for a long time. Therefore, it is an inefficient process in terms of actual commercial production.

Therefore, a process for producing an $\varepsilon$-$Fe_2O_3$ powder by a short time and a simple process is required. In the present invention, after forming a droplet by spraying a precursor solution, a drying process and a heat treatment process may be performed to produce a hard magnetic iron oxide of $\varepsilon$-$Fe_2O_3$. Therefore, the $\varepsilon$-$Fe_2O_3$ powder may be produced by a short time and a simple process.

Here, in the present invention, preferably, a temperature of the heat treatment is 1120 to 1210° C. More preferably, the temperature of the heat treatment is 1150 to 1180° C.

The critical significance of the temperature of the heat treatment will be described later.

By the heat treatment as described above, the ε crystal phase is realized, and accordingly, a proportion of the ε-$Fe_2O_3$ powder is changed by the temperature of the heat treatment described above.

In other words, depending on conditions of the heat treatment, a γ crystal phase is realized as an ε crystal phase, and the ε crystal phase is realized as an α crystal phase. After all, depending on the conditions of the heat treatment, γ-$Fe_2O_3$ is realized as ε-$Fe_2O_3$, and ε-$Fe_2O_3$ is realized as α-$Fe_2O_3$. Therefore, it may be said that the temperature of the heat treatment is very important.

In the present invention, in the iron oxide/silica composite powder 140, depending on the temperature of the heat treatment, a proportion of the hard magnetic iron oxide in the iron oxide, that is, ε-$Fe_2O_3$, corresponds to 70 to 100%, and a proportion of the remaining iron oxide other than the hard magnetic iron oxide in the iron oxide corresponds to 0 or greater than 0 and less than 30%, in which the remaining iron oxide may be α-$Fe_2O_3$.

Figure 4:
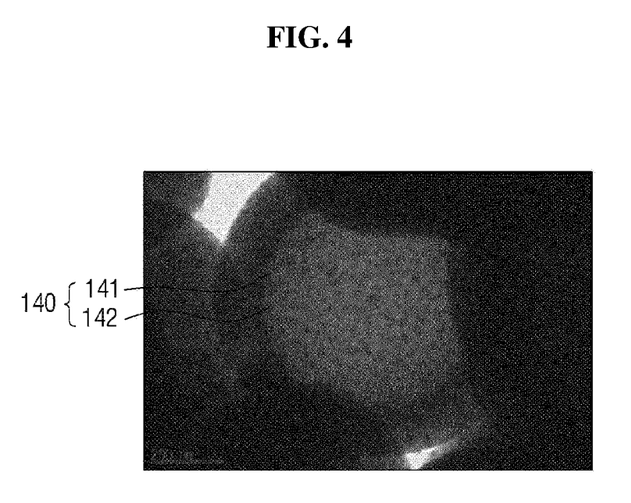
FIG. 4 is a real picture showing an iron oxide/silica composite powder according to the present invention.

FIG. 4 is a real picture showing an iron oxide/silica composite powder according to the present invention.

Referring to FIG. 4, it may be seen that the iron oxide/silica composite powder 140 according to the present invention is formed by incorporating nano-sized iron oxide particles 142 in the silica 141 matrix.

Hereinafter, the iron oxide/silica composite powder 140 in which the iron oxide particles are embedded in the silica matrix may be expressed as ε-$Fe_2O_3$@$SiO_2$.

Next, referring to FIGS. 1 and 2, the method for producing the iron oxide magnetic powder according to the present invention includes removing the silica matrix of the iron oxide/silica composite powder 140 through a washing process to produce an iron oxide powder 150 (S150).

In the present invention, a magnetic powder may also be implemented through the iron oxide/silica composite powder 140 of step S140 described above. However, if necessary, the iron oxide powder may be implemented as a magnetic powder by removing the silica matrix from the iron oxide/silica composite powder 140 to produce the iron oxide powder.

Here, in removing the silica ($SiO_2$) matrix, after the iron oxide/silica composite powder 140, that is, ε-$Fe_2O_3$@$SiO_2$ is etched in a NaOH solution, the washing process is performed through distilled water, acetone, ethyl alcohol, etc. to remove organic substances, thereby enabling to produce the ε-$Fe_2O_3$ powder from which the matrix (i.e., $SiO_2$) is removed.

In addition, the proportion of the hard magnetic iron oxide, that is, ε-$Fe_2O_3$, in the iron oxide powder 150 in step S150 corresponds to 70 to 100%, and the proportion of the remaining iron oxide other than the hard magnetic iron oxide in the iron oxide corresponds to 0 or greater than 0 and less than 30%, in which the remaining iron oxide may be α-$Fe_2O_3$.

Figure 5:
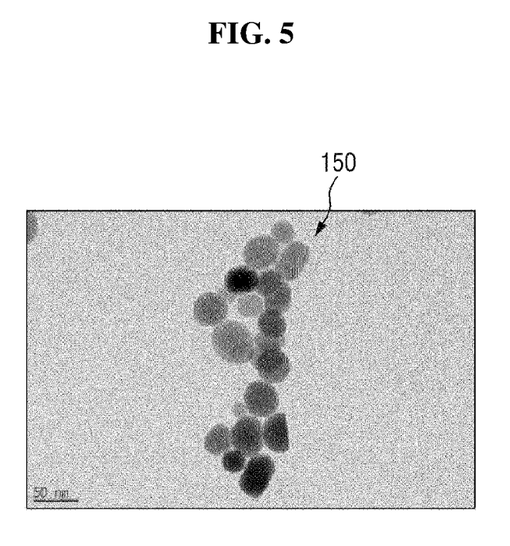
FIG. 5 is a real picture showing an iron oxide powder according to the present invention.

FIG. 5 is a real picture showing an iron oxide powder according to the present invention.

Referring to FIG. 5, the iron oxide powder 150 according to the present invention shows a state in which the silica matrix is removed by the washing process. Here, a diameter of the iron oxide particles of the iron oxide powder 150 according to the present invention may correspond to 20 to 45 nm. More preferably, the diameter of the iron oxide particles in the iron oxide powder 150 may correspond to 30 to 45 nm.

The magnetic powder according to the present invention as described above may be defined as follows.

First, as in FIG. 4 described above, a magnetic powder 140 according to the present invention includes the silica matrix 141; and the iron oxide particles 142 embedded in the silica matrix 141, in which the iron oxide particles include hard magnetic iron oxide particles, and the hard magnetic iron oxide particles correspond to ε-$Fe_2O_3$.

Here, in the present invention, the silica matrix corresponds to amorphous silica.

In addition, as in FIG. 5 described above, when the silica matrix is removed by the washing process, a magnetic powder 150 according to the present invention includes the iron oxide particles 142, in which the iron oxide particles include hard magnetic iron oxide particles, and the hard magnetic iron oxide particles correspond to ε-$Fe_2O_3$.

In addition, a diameter of the iron oxide particles according to the present invention may correspond to 20 to 45 nm, and more preferably, the diameter of the iron oxide particles may correspond to 30 to 45 nm.

In addition, in the iron oxide/silica composite powder 140, a proportion of the hard magnetic iron oxide in the iron oxide, that is, ε-$Fe_2O_3$, corresponds to 60 to 100%, and a proportion of the remaining iron oxide other than the hard magnetic iron oxide in the iron oxide corresponds to 0 or greater than 0 and less than 40%, in which the remaining iron oxide may be α-$Fe_2O_3$.

In addition, more preferably, in the iron oxide/silica composite powder 140, the proportion of the hard magnetic iron oxide in the iron oxide, that is, ε-$Fe_2O_3$, corresponds to 70 to 100%, and the proportion of the remaining iron oxide other than the hard magnetic iron oxide in the iron oxide corresponds to 0 or greater than 0 and less than 30%, in which the remaining iron oxide may be α-$Fe_2O_3$.

In addition, the proportion of the hard magnetic iron oxide, that is, ε-$Fe_2O_3$, in the iron oxide powder 150 in step S150 corresponds to 60 to 100%, and the proportion of the remaining iron oxide other than the hard magnetic iron oxide in the iron oxide corresponds to 0 or greater than 0 and less than 40%, in which the remaining iron oxide may be α-$Fe_2O_3$.

In addition, more specifically, the proportion of the hard magnetic iron oxide, that is, ε-$Fe_2O_3$, in the iron oxide powder 150 in step S150 corresponds to 70 to 100%, and the proportion of the remaining iron oxide other than the hard magnetic iron oxide in the iron oxide corresponds to 0 or greater than 0 and less than 30%, in which the remaining iron oxide may be α-$Fe_2O_3$.

The magnetic powder according to the present invention as described above may be molded into a desired shape and sintered or combined with a binder such as a resin to produce a permanent magnet.

For example, a sintered magnet may be obtained by forming the magnetic powder into a desired shape and heat treating the obtained molded body in an inert atmosphere or vacuum. In addition, the sintered magnet may also be obtained by sintering the molded body by plasma activated sintering (PAS) or spark plasma sintering (SPS). Further, an anisotropic sintered magnet may be produced by molding in a magnetic field.

Additionally, a bond magnet may be obtained by blending and molding the magnetic powder and a binder.

Here, a resin material such as a thermoplastic resin or a thermosetting resin, or a low melting point metal such as Al, Pb, Sn, Zn or Mg, or an alloy composed of these low melting point metals may be used as the binder.

Further, the magnetic powder may be molded into a desired shape by compression molding or injection molding the mixture of the magnetic powder and the binder. In addition, an anisotropic bond magnet may be produced by molding the magnetic powder in a magnetic field.

Mode of the Invention

Hereinafter, the present invention will be described through experimental examples according to the present invention. However, the following experimental examples are only illustrative of the present invention, and the contents of the present invention are not limited to the following experimental examples.

[Production of ε-$Fe_2O_3$ Powder According to the Present Invention]

In order to produce a hard magnetic iron oxide (ε-$Fe_2O_3$) powder, spray drying was performed using a precursor solution containing a silica precursor solution such as TEOS or sodium silicate in a solution containing an iron precursor, water and a low-cost alcohol solvent.

A concentration of a spray solution formed by dissolving the precursor compound in a solvent is not particularly limited as long as it may be applied to a spray drying process to form particles of a desired size.

However, when the concentration of the spray solution is more than a saturated solubility, a uniform precursor solution is not produced. Therefore, it is not possible to synthesize an aggregate structure of a desired composition. Therefore, the concentration of the spray solution in the present invention may be appropriately adjusted within a concentration range that allows the solubility of each component constituting an aggregate, that is, the saturated solubility.

The iron/silica precursor particles are produced by spraying and drying the precursor solution, in which a temperature of an inlet of a spraying device was maintained at 200 degrees, and a temperature of outlet was maintained at 110 degrees or higher.

Here, in order to adjust a drying rate of droplets, a solution feed rate, hot air volume, solids concentration, and alcohol concentration may be varied, and the iron/silica precursor particles were produced.

Thereafter, the collected powder was heat treated under air at 1120 to 1210° C. for 4 hours to obtain a hard magnetic iron oxide/silica composite magnetic powder.

Subsequently, in order to remove matrix silica, a NaOH solution was added, and etching and washing were performed at a temperature of 70° C. to obtain the hard magnetic iron oxide powder.

[Production of ε-$Fe_2O_3$ Powder Using Reverse Micelle Method and Sol-Gel Method]

After distilled water, $Fe(NO_3)_3 \cdot 9H_2O$, $Ba(NO_3)_2$ solution were injected into an oil (1-butanol+n-octane) solution, a surfactant, CTAB (Hexadecyltrimethylammonium bromide) is put and stirred for about 30 minutes to dissolve the CTAB to make a reverse micelle solution 1. A mixed solution of distilled water and NH4OH was injected into it, and then CTAB was added and stirred for 30 minutes to dissolve CTAB, thereby producing a reverse micelle solution 2.

The reverse micelle 2 solution was slowly injected into the reverse micelle 1 solution and stirred for 30 minutes. After that, the silica precursor solution is injected into the mixed solution and stirred for 24 hours. After stirring, the solution was centrifuged, and precipitates was washed with chloroform and methyl alcohol, and then dried in an oven at 80° C.

The dried powder is heat treated in air at 1150° C. for 4 hours in a sintering furnace. After the heat treatment, a hard magnetic iron oxide/silica composite magnetic powder could be obtained. In addition, in order to remove silica, it was put in a NaOH solution, and etching and washing were performed at a temperature of 70° C. to obtain a hard magnetic iron oxide powder.

Hereinafter, results according to concentrations and heat treatment conditions of the iron precursor of the powder produced according to the present invention will be described.

Table 1 below is a table showing a result of a change in crystal phase according to a change in concentration of the iron precursor of the powder produced according to the present invention and a result of a change in crystal phase according to the powder produced according to the reverse micelle method/sol-gel method. In Table 1, the concentration of the iron precursor means the concentration of the iron precursor compared to 1 mol % of the silica precursor.

TABLE 1

| 1180° C. | γ-$Fe_2O_3$ | ε-$Fe_2O_3$ | α-$Fe_2O_3$ | Cristobalite |
|---|---|---|---|---|
| Conventional method | — | — | 11.4 | 88.6 |
| 15 mol % | — | 64.9 | 35.1 | — |
| 40 mol % | — | 83.5 | 16.3 | — |
| 60 mol % | — | 70.4 | 29.6 | — |
| 80 mol % | — | 28.7 | 71.3 | — |

Referring to Table 1, in a temperature at the time of the heat treatment is 1180° C., in the case of the powder produced according to the conventional method, that is, the reverse micelle method/sol-gel method, it may be seen that ε-$Fe_2O_3$, which is hard magnetic iron oxide phase, was not shown, and the proportion of α-$Fe_2O_3$, which is a nonmagnetic iron oxide phase, is 11.4%.

However, when the temperature during the heat treatment is 1180° C. and the concentration of the iron precursor is 15 mol %, it may be seen that the proportion of the hard magnetic iron oxide in the iron oxide, that is, ε-$Fe_2O_3$, corresponds to 64.9%, and the proportion of the remaining iron oxide other than the hard magnetic iron oxide in the iron oxide, that is, α-$Fe_2O_3$, corresponds to 35.1%.

In addition, when the temperature during the heat treatment is 1180° C. and the concentration of the iron precursor is 40 mol %, it may be seen that the proportion of the hard magnetic iron oxide in the iron oxide, that is, ε-$Fe_2O_3$, corresponds to 83.5%, and the proportion of the remaining iron oxide other than the hard magnetic iron oxide in the iron oxide, that is, α-$Fe_2O_3$, corresponds to 16.3%.

In addition, when the temperature during the heat treatment is 1180° C. and the concentration of the iron precursor is 60 mol %, it may be seen that the proportion of the hard magnetic iron oxide in the iron oxide, that is, ε-$Fe_2O_3$, corresponds to 70.4%, and the proportion of the remaining iron oxide other than the hard magnetic iron oxide in the iron oxide, that is, α-$Fe_2O_3$, corresponds to 29.6%.

In addition, when the temperature during the heat treatment is 1180° C. and the concentration of the iron precursor is 80 mol %, it may be seen that the proportion of the hard magnetic iron oxide in the iron oxide, that is, ε-$Fe_2O_3$, corresponds to 28.7%, and the proportion of the remaining iron oxide other than the hard magnetic iron oxide in the iron oxide, that is, α-$Fe_2O_3$, corresponds to 71.3%.

As a result, it may be seen that, even in the case of heat treatment at the same temperature, ε-$Fe_2O_3$, which is the hard magnetic iron oxide phase of the powder produced according to the conventional method (i.e., reverse micelle method/sol-gel method), is not formed.

Figure 6:
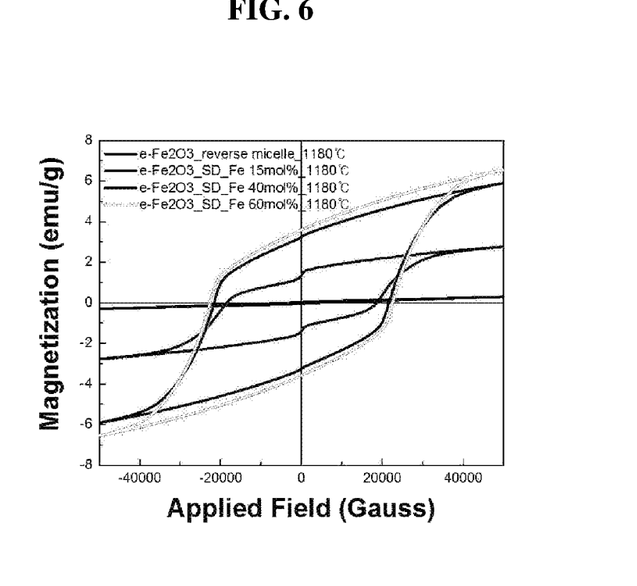
FIG. 6 is a graph showing coercive force results according to a change in a concentration of an iron precursor in the powder produced according to the present invention and coercive force results according to the powder produced according to a reverse micelle method/sol-gel method.

FIG. 6 is a graph showing coercive force results according to a change in a concentration of an iron precursor in the powder produced according to the present invention and coercive force results according to the powder produced according to a reverse micelle method/sol-gel method. Here, conditions in FIG. 6 are the same as those in Table 1.

Referring to FIG. 6, in the temperature during the heat treatment is 1180° C., it may be seen that, in the case of the powder produced according to the conventional method, that is, the reverse micelle method/sol-gel method, a coercive force value is hardly expressed.

However, when the temperature during the heat treatment is 1180° C. and the concentration of the iron precursor is 15 mol %, it may be seen that the coercive force value increases compared to the conventional method. In addition, when the temperature during the heat treatment is 1180° C. and the concentration of the iron precursor is 40 mol % and 60 mol %, respectively, it may be seen that the coercive force value is significantly increased compared to the conventional method.

Therefore, in the present invention, preferably, the concentration of the iron precursor is 15 to 60 mol % compared to 1 mol % of the silica precursor. More preferably, the concentration of the iron precursor is 40 to 60 mol % compared to 1 mol % of the silica precursor.

Table 2 is a table showing the result of the change in crystal phase according to the change in temperature during the heat treatment of the iron precursor of the powder produced according to the present invention.

Figure 7:
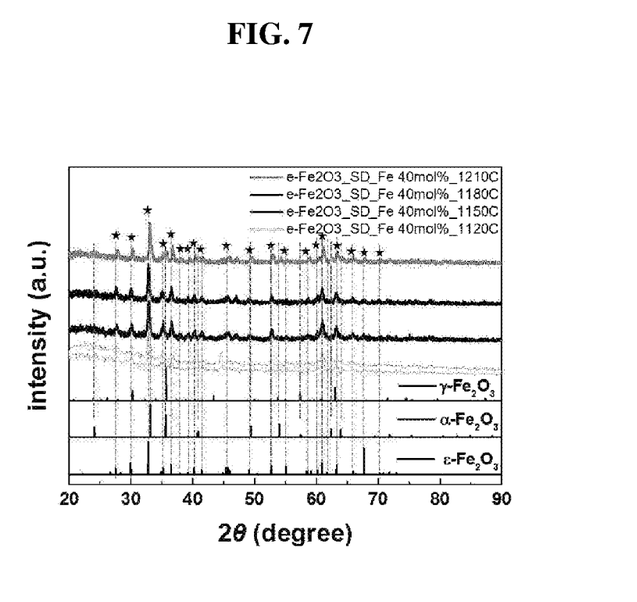
FIG. 7 is an XRD graph of a change in temperature during the heat treatment of the iron precursor of the powder produced according to the present invention.

FIG. 7 is an XRD graph of a change in temperature during the heat treatment of the iron precursor of the powder produced according to the present invention. Here, conditions in FIG. 6 are the same as those in Table 2.

TABLE 2

| 40 mol % | γ-$Fe_2O_3$ | ε-$Fe_2O_3$ | α-$Fe_2O_3$ | FWHM of ε-$Fe_2O_3$ |
|---|---|---|---|---|
| 1120° C. | — | 71.2 | 28.8 | 0.42(0.4227) |
| 1150° C. | — | 100 | 0 | 0.40(0.3957) |
| 1180° C. | — | 83.5 | 16.3 | 0.38 |
| 1210° C. | — | 66.0 | 34.0 | 0.36(0.3564) |

Referring to Tables 2 and FIG. 7, when the concentration of the iron precursor is 40 mol % and the temperature during the heat treatment is 1120° C., it may be seen that the proportion of the hard magnetic iron oxide in the iron oxide, that is, ε-$Fe_2O_3$, corresponds to 71.2%, and the proportion of the remaining iron oxide other than the hard magnetic iron oxide in the iron oxide, that is, α-$Fe_2O_3$, corresponds to 28.8%. In addition, when the concentration of the iron precursor is 40 mol % and the temperature during the heat treatment is 1150° C., it may be seen that the proportion of the hard magnetic iron oxide in the iron oxide, that is, ε-$Fe_2O_3$, corresponds to 100%, and the proportion of the remaining iron oxide other than the hard magnetic iron oxide in the iron oxide corresponds to 0%.

In addition, when the concentration of the iron precursor is 40 mol % and the temperature during the heat treatment is 1180° C., it may be seen that the proportion of the hard magnetic iron oxide in the iron oxide, that is, ε-$Fe_2O_3$, corresponds to 83.5%, and the proportion of the remaining iron oxide other than the hard magnetic iron oxide in the iron oxide, that is, α-$Fe_2O_3$, corresponds to 16.3%.

In addition, when the concentration of the iron precursor is 40 mol % and the temperature during the heat treatment is 1210° C., it may be seen that the proportion of the hard magnetic iron oxide in the iron oxide, that is, ε-$Fe_2O_3$, corresponds to 66.0%, and the proportion of the remaining iron oxide other than the hard magnetic iron oxide in the iron oxide, that is, α-$Fe_2O_3$, corresponds to 34.0%.

Therefore, in the present invention, preferably, the temperature of the heat treatment is 1120 to 1210° C. More preferably, the temperature of the heat treatment is 1150 to 1180° C.

According to the results, by the heat treatment as described above, the ε crystal phase is realized, and thus, the proportion of the ε-$Fe_2O_3$ powder is changed by the temperature of the heat treatment described above.

In other words, depending on conditions of the heat treatment, a γ crystal phase is realized as an ε crystal phase, and the ε crystal phase is realized as an α crystal phase. After all, depending on the conditions of the heat treatment, γ-$Fe_2O_3$ is realized as ε-$Fe_2O_3$, and ε-$Fe_2O_3$ is realized as α-$Fe_2O_3$. Therefore, it may be said that the temperature of the heat treatment is very important.

According to the results of Tables 1 and 2, and FIGS. 6 and 7 as described above, in the iron oxide/silica composite powder 140, the proportion of the hard magnetic iron oxide in the iron oxide, that is, ε-$Fe_2O_3$, corresponds to 60 to 100%, and the proportion of the remaining iron oxide other than the hard magnetic iron oxide in the iron oxide corresponds to 0 or greater than 0 and less than 40%. Here, the remaining iron oxide may be α-$Fe_2O_3$.

In addition, more preferably, in the iron oxide/silica composite powder 140, the proportion of the hard magnetic iron oxide in the iron oxide, that is, ε-$Fe_2O_3$, corresponds to 70 to 100%, and the proportion of the remaining iron oxide other than the hard magnetic iron oxide in the iron oxide corresponds to 0 or greater than 0 and less than 30% in which the remaining iron oxide may be α-$Fe_2O_3$.

In addition, the proportion of the hard magnetic iron oxide, that is, ε-$Fe_2O_3$, in the iron oxide powder 150 in step S150 corresponds to 60 to 100%, and the proportion of the remaining iron oxide other than the hard magnetic iron oxide in the iron oxide corresponds to 0 or greater than 0 and less than 40%, in which the remaining iron oxide may be α-$Fe_2O_3$.

In addition, more specifically, the proportion of the hard magnetic iron oxide, that is, ε-$Fe_2O_3$, in the iron oxide powder 150 in step S150 corresponds to 70 to 100%, and the proportion of the remaining iron oxide other than the hard magnetic iron oxide in the iron oxide corresponds to 0 or greater than 0 and less than 30%, in which the remaining iron oxide may be α-$Fe_2O_3$.

Subsequently, ε-$Fe_2O_3$ according to the present invention is defined with reference to Table 2 above.

More specifically, in order to define ε-$Fe_2O_3$ according to the present invention, a full width at half-maximum (FWHM) of a diffraction peak with respect to a {122} plane, which is a main peak of an ε-$Fe_2O_3$ crystal phase, was measured.

Hereinafter, for convenience of explanation, the full width at half-maximum (FWHM) of the diffraction peak with respect to the {122} plane, which is the main peak of the ε-$Fe_2O_3$ crystal phase, will be defined as the FWHM of ε-$Fe_2O_3$.

As shown in Table 2, when the temperature of the heat treatment is 1120° C., a value of the FWHM of ε-$Fe_2O_3$ corresponds to 0.42°. When the temperature of the heat treatment is 1150° C., the value of the FWHM of ε-$Fe_2O_3$ corresponds to 0.40°. When the temperature of the heat treatment is 1180° C., the value of the FWHM of ε-$Fe_2O_3$ corresponds to 0.38°. When the temperature of the heat treatment is 1210° C., the value of the FWHM of ε-$Fe_2O_3$ corresponds to 0.36°.

As described above, in the present invention, preferably, the temperature of the heat treatment is 1120 to 1210° C. More preferably, the temperature of the heat treatment is 1150 to 1180° C.

When expressing a temperature range of the heat treatment as the value of the FWHM of $\varepsilon$-$Fe_2O_3$, in the present invention, preferably, the value of the FWHM of $\varepsilon$-$Fe_2O_3$ is 0.36° to 0.42°. In addition, in the present invention, more preferably, the value of the FWHM of $\varepsilon$-$Fe_2O_3$ is 0.38° to 0.40°.

As described above, in the present invention, the value of the FWHM of $\varepsilon$-$Fe_2O_3$ means the full width at half-maximum (FWHM) of the diffraction peak with respect to the {122} plane, which is the main peak of the crystal phase of $\varepsilon$-$Fe_2O_3$, and the rest are the same.

Table 3 below is a table showing a change in particle size of the powder according to the change in concentration of the iron precursor of the powder produced according to the present invention.

Figure 8:
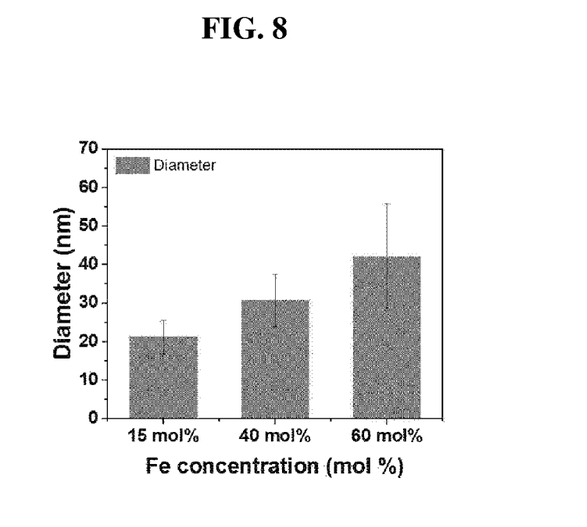
FIG. 8 is a graph showing a change in particle size of the powder according to the change in the concentration of the iron precursor of the powder produced according to the present invention.

FIG. 8 is a graph showing a change in particle size of the powder according to the change in the concentration of the iron precursor of the powder produced according to the present invention.

Figure 9:
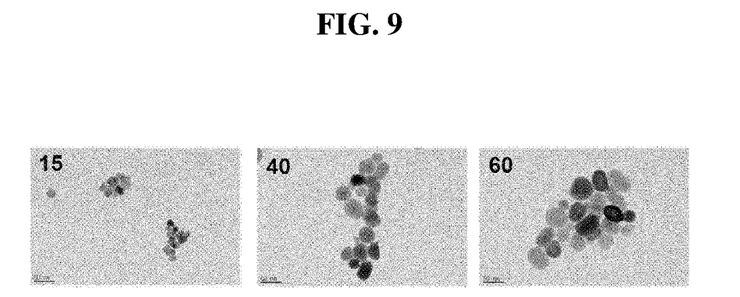
FIG. 9 is a real picture showing the particle size of the powder according to the change in the concentration of the iron precursor of the powder produced according to the present invention.

In addition, FIG. 9 is a real picture showing the particle size of the powder according to the change in the concentration of the iron precursor of the powder produced according to the present invention.

Here, the conditions in Table 3, and FIGS. 8 and 9 are the same as those in Table 1.

TABLE 3

| Mol % | Avg. Diameter | STDVE |
|---|---|---|
| 15 | 21.1 | 4.4 |
| 40 | 30.6 | 6.8 |
| 60 | 41.9 | 13.9 |

Referring to Table 3, and FIGS. 8 and 9, when the temperature during the heat treatment is 1180° C. and the concentration of the iron precursor is 15 mol %, it shows a particle size distribution of an average 21.1 nm diameter.

In addition, when the temperature during the heat treatment is 1180° C. and the concentration of the iron precursor is 40 mol % and 60 mol %, respectively, it shows a particle size distribution of an average 30.6 nm diameter, and an average 41.9 nm diameter, respectively.

Therefore, a diameter of the iron oxide powder 150 according to the present invention may correspond to 20 to 45 nm. More preferably, the diameter of the iron oxide powder 150 may correspond to 30 to 45 nm.

As described above, the known $\varepsilon$-$Fe_2O_3$ powder is produced by using the reverse micelle method and the sol-gel method.

However, the method for producing $\varepsilon$-$Fe_2O_3$ powder using the reverse micelle method and the sol-gel method is a multi-step process that must be performed for a long time. Therefore, it is an inefficient process in terms of actual commercial production.

Therefore, a process for producing an $\varepsilon$-$Fe_2O_3$ powder by a short time and a simple process is required. In the present invention, after forming a droplet by spraying a precursor solution, a drying process and a heat treatment process may be performed to produce a hard magnetic iron oxide of $\varepsilon$-$Fe_2O_3$. Therefore, the $\varepsilon$-$Fe_2O_3$ powder may be produced by a short time and a simple process.

The applicant conducted additional experiments according to the change in temperature during the heat treatment of the iron precursor of the powder produced according to the present invention.

In other words, the applicant measured the proportion of the hard magnetic iron oxide in the iron oxide, that is, $\varepsilon$-$Fe_2O_3$, and the proportion of the remaining iron oxide other than the hard magnetic iron oxide in the iron oxide, for example, $\alpha$-$Fe_2O_3$, depending on the change in temperature during the heat treatment in a range other than the temperature range of Table 2 as described above.

Figure 10:
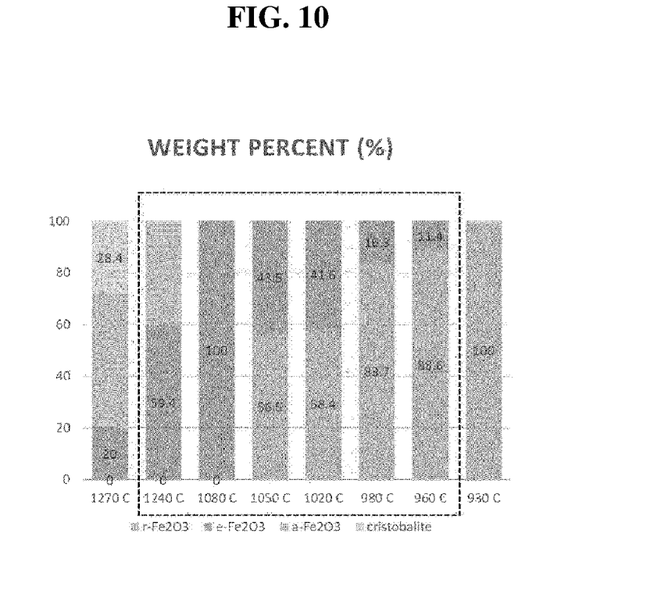
FIG. 10 is a graph showing a proportion of the iron oxide according to a change in temperature during the heat treatment of the iron precursor of the powder produced according to the present invention.
Figure 11:
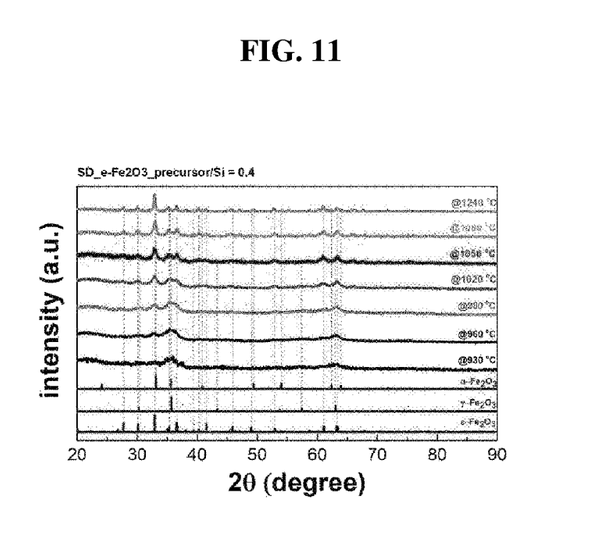
FIG. 11 is an XRD graph of the change in temperature during the heat treatment according to conditions of FIG. 10.

FIG. 10 is a graph showing a proportion of the iron oxide according to a change in temperature during the heat treatment of the iron precursor of the powder produced according to the present invention, and FIG. 11 is an XRD graph of the change in temperature during the heat treatment according to conditions of FIG. 10.

In addition, Table 4 below shows the proportion of the iron oxide according to the change in temperature during the heat treatment of the iron precursor of the powder produced according to the present invention of FIG. 10.

TABLE 4

| 40 mol % | $\gamma$-$Fe_2O_3$ | $\varepsilon$-$Fe_2O_3$ | $\alpha$-$Fe_2O_3$ | FWHM of $\varepsilon$-$Fe_2O_3$ |
|---|---|---|---|---|
| 960° C. | 88.6 | 11.4 | — | 1.06(1.0574) |
| 980° C. | 83.7 | 16.3 | — | 0.85(0.8486) |
| 1020° C. | 58.4 | 41.6 | — | 0.72(0.721) |
| 1050° C. | 56.5 | 43.5 | — | 0.60(0.6041) |
| 1080° C. | — | 100 | — | 0.53(0.532) |
| 1240° C. | — | 59.4 | 40.6 | 0.30(0.2973) |

As described above, based on Table 2 and FIG. 7, preferably, in the present invention, the temperature of the heat treatment is 1120 to 1210° C. More preferably, the temperature of the heat treatment is 1150 to 1180° C.

According to results of the additional experiment according to the change in temperature during the heat treatment of the iron precursor of the powder produced according to the present invention, that is, results of Table 4 and FIGS. 10 and 11, it may be seen that when the temperature of the heat treatment of the iron precursor of the powder produced according to the present invention is 1080° C., the proportion of the hard magnetic iron oxide, that is, $\varepsilon$-$Fe_2O_3$, in iron oxide corresponds to 100%.

Therefore, in the present invention, preferably, the temperature of the heat treatment is 1080 to 1210° C. In addition, preferably, the temperature of the heat treatment is 1080 to 1180° C. In addition, more preferably, the temperature of the heat treatment is 1080 to 1150° C.

In the same manner as in Table 2 above, $\varepsilon$-$Fe_2O_3$ according to the present invention is defined as follows through the full width at half-maximum (FWHM) of the diffraction peaks for the {122} plane, which is the main peak of the $\varepsilon$-$Fe_2O_3$ crystal phase.

As shown in Table 4, when the temperature of the heat treatment is 960° C., the value of the FWHM of $\varepsilon$-$Fe_2O_3$ corresponds to 1.06°. When the temperature of the heat treatment is 980° C., the value of the FWHM of $\varepsilon$-$Fe_2O_3$ corresponds to 0.85°. When the temperature of the heat treatment is 1020° C., the value of the FWHM of $\varepsilon$-$Fe_2O_3$ corresponds to 0.72°. When the temperature of the heat treatment is 1050° C., the value of the FWHM of $\varepsilon$-$Fe_2O_3$ corresponds to 0.60°. When the temperature of the heat treatment is 1080° C., the value of the FWHM of $\varepsilon$-$Fe_2O_3$ corresponds to 0.530° When the temperature of the heat treatment is 1240° C., the value of the FWHM of ε-Fe$_2$O$_3$ corresponds to 0.30°.

Here, based on Table 2 and FIG. 7, preferably, in the present invention, the temperature of the heat treatment is 1120 to 1210° C. More preferably, the temperature of the heat treatment is 1150 to 1180° C.

Therefore, in this case, when expressing a temperature range of the heat treatment as the value of the FWHM of ε-Fe$_2$O$_3$, in the present invention, preferably, the value of the FWHM of ε-Fe$_2$O$_3$ is 0.36° to 0.42°. In addition, in the present invention, more preferably, the value of the FWHM of ε-Fe$_2$O$_3$ is 0.38° to 0.40°.

According to the results of the additional experiment according to the change in temperature during the heat treatment of the iron precursor of the powder produced according to the present invention, that is, the results of Table 4 and FIGS. 10 and 11, in the present invention, preferably, the temperature of the heat treatment is 1080 to 1210° C. In addition, preferably, the temperature of the heat treatment is 1080 to 1180° C. In addition, more preferably, the temperature of the heat treatment is 1080 to 1150° C.

Therefore, in reflecting these results, when the temperature of the heat treatment is 1080° C., the value of the FWHM of ε-Fe$_2$O$_3$ corresponds to 0.53°. Therefore, in the present invention, preferably, the value of the FWHM of ε-Fe$_2$O$_3$ is 0.36° to 0.53°. In addition, in the present invention, preferably, the value of the FWHM of ε-Fe$_2$O$_3$ is 0.38° to 0.53°. In addition, in the present invention, more preferably, the value of the FWHM of ε-Fe$_2$O$_3$ is 0.40° to 0.53°.

The embodiments of the present invention have been described with reference to the accompanying drawings. However, it may be understood that those of ordinary skill in the art to which the present invention pertains may implement the present invention in other specific forms without changing its technical spirit or essential features. Therefore, it is to be understood that the above-described embodiments are illustrative in all aspects and not restrictive.

The invention claimed is:

1. A magnetic powder, comprising:
   a silica matrix; and
   particles of an iron oxide embedded in the silica matrix,
   wherein the particles of the iron oxide comprises particles of a hard magnetic iron oxide, and wherein the particles of the hard magnetic iron oxide are ε-Fe$_2$O$_3$, and
   wherein a value of a full width at half-maximum (FWHM) of the ε-Fe$_2$O$_3$ is 0.36° to 0.53°, which results from measuring a diffraction peak of a {122} plane as a main peak of a crystal phase of the ε-Fe$_2$O$_3$.

2. The magnetic powder of claim 1, wherein a proportion of the particles of the hard magnetic iron oxide in the iron oxide corresponds to 70 to 100%, a proportion of the remaining iron oxide other than the hard magnetic iron oxide in the iron oxide is less than 30%, and the remaining iron oxide is α-Fe$_2$O$_3$.

3. The magnetic powder of claim 1, wherein a diameter of the particles of the iron oxide is 20 to 45 nm.

4. The magnetic powder of claim 1, wherein the value of the FWHM of the ε-Fe$_2$O$_3$ is 0.40° to 0.53°.

5. A magnetic powder, comprising:
   particles of an iron oxide,
   wherein the particles of the iron oxide comprise particles of a hard magnetic iron oxide, and wherein the particles of the hard magnetic iron oxide are ε-Fe$_2$O$_3$, and
   wherein a value of a full width at half-maximum (FWHM) of the ε-Fe$_2$O$_3$ is 0.36° to 0.53°, which results from measuring a diffraction peak of a {122} plane as a main peak of a crystal phase of the ε-Fe$_2$O$_3$.

6. The magnetic powder of claim 5, wherein a proportion of the particles of the hard magnetic iron oxide in the particles of the iron oxide corresponds to 70 to 100%, a proportion of the remaining iron oxide other than the hard magnetic iron oxide in the particles of the iron oxide is less than 30%, and the remaining iron oxide is α-Fe$_2$O$_3$.

7. The magnetic powder of claim 5, wherein a diameter of the particles of the iron oxide is 20 to 45 nm.

8. The magnetic powder of claim 5, wherein the value of the FWHM of the ε-Fe$_2$O$_3$ is 0.40° to 0.53°.

9. A method for producing the magnetic powder according to claim 1, comprising:
   preparing a precursor solution containing an iron precursor and a silica precursor;
   spraying the precursor solution to form iron/silica precursor droplets;
   drying the iron/silica precursor droplets to produce iron/silica precursor particles; and
   heat treating the iron/silica precursor particles to produce an iron oxide/silica composite powder in which iron oxide particles are embedded in a silica matrix.

10. The method of claim 9, further comprising:
    producing an iron oxide powder by removing the silica matrix of the iron oxide/silica composite powder through a washing process.

11. The method of claim 9, wherein a temperature of the heat treating is 1080 to 1210° C.

12. The method of claim 11, wherein the temperature of the heat treating is 1080 to 1150° C.

13. The method of claim 9, wherein a concentration of the iron precursor in the precursor solution is 15 to 60 mol % compared to 1 mol % of the silica precursor.

* * * * *